United States Patent  (10) Patent No.: US 12,202,568 B2
Ben Attouch  (45) Date of Patent: Jan. 21, 2025

(54) SWITCH ASSEMBLY FOR MOUNTING TO A HANDLEBAR OF A VEHICLE

(71) Applicant: BOMBARDIER RECREATIONAL PRODUCTS INC., Valcourt (CA)

(72) Inventor: Walid Ben Attouch, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 60 days.

(21) Appl. No.: 17/781,026

(22) PCT Filed: Nov. 30, 2020

(86) PCT No.: PCT/IB2020/061277
§ 371 (c)(1),
(2) Date: May 30, 2022

(87) PCT Pub. No.: WO2021/105967
PCT Pub. Date: Jun. 3, 2021

(65) Prior Publication Data
US 2022/0411005 A1 Dec. 29, 2022

Related U.S. Application Data

(60) Provisional application No. 62/941,963, filed on Nov. 29, 2019.

(51) Int. Cl.
*B62K 11/14* (2006.01)
*B62K 23/02* (2006.01)
(Continued)

(52) U.S. Cl.
CPC .............. *B62K 11/14* (2013.01); *B62K 23/02* (2013.01); *H01H 23/16* (2013.01); *B62K 5/01* (2013.01)

(58) Field of Classification Search
None
See application file for complete search history.

(56) References Cited

U.S. PATENT DOCUMENTS 4,710,599 A 12/1987 Motodate et al.
6,762,377 B2 7/2004 Abrahamson
(Continued)

FOREIGN PATENT DOCUMENTS

EP 2868560 A1 5/2015
RU 2222455 C2 1/2004

OTHER PUBLICATIONS

International Search Report of PCT/IB2020/061277; Lee Young; May 25, 2021.
(Continued)

*Primary Examiner* — Vicky A Johnson
(74) *Attorney, Agent, or Firm* — BCF LLP

(57) ABSTRACT

A switch assembly for mounting to a handlebar of a vehicle is disclosed. The switch assembly has a main housing mounted to the handlebar. The main housing has a first lateral side, a second lateral side opposite the first lateral side, a rear side, and a front side. The main housing defines a recess. The recess opens in the first lateral side and the rear side. The switch assembly also has one of: a cap selectively received in the recess; and a switch housing selectively received in the recess. The switch housing has a switch mounted thereto. The switch is configured for communicating with a component of the vehicle. The recess is configured for receiving the cap and for receiving the switch housing. A vehicle having a handlebar with the switch assembly mounted thereto is also disclosed.

18 Claims, 13 Drawing Sheets

(51) Int. Cl.
*H01H 23/16* (2006.01)
*B62K 5/01* (2013.01)

(56) References Cited

U.S. PATENT DOCUMENTS

| | | |
|---|---|---|
| 2008/0283371 A1 | 11/2008 | Reed et al. |
| 2010/0270135 A1 | 10/2010 | Murasawa et al. |
| 2015/0100204 A1 | 4/2015 | Gondo |
| 2019/0217916 A1 | 7/2019 | Kakinoki et al. |
| 2020/0062332 A1* | 2/2020 | Osanai .................. B62K 23/02 |

OTHER PUBLICATIONS

Decision to Grant issued from the Rospatent on Apr. 5, 2024 in connection with the corresponding application No. 2022117598.

* cited by examiner

SWITCH ASSEMBLY FOR MOUNTING TO A HANDLEBAR OF A VEHICLE

CROSS-REFERENCE

The present application claims priority to U.S. Provisional Patent Application No. 62/941,963, filed Nov. 29, 2019, the entirety of which is incorporated herein by reference.

FIELD OF TECHNOLOGY

The present technology relates to switch assemblies for mounting to a handlebar of a vehicle and to vehicles provided with such switch assemblies.

BACKGROUND

Vehicles in which steering is accomplished using a handlebar typically have limited space to place the various switches needed to control various vehicle functions and accessories.

Many vehicle manufacturers provide a switch assembly mounted onto the handlebar which consists of a housing onto which the various switches are provided. In some vehicle, one switch assembly is provided on a left portion of the handlebar and another switch assembly is provided on a right portion of the handlebar.

Vehicle manufacturers often offer to their customer to add various optional equipment and/or accessories when they make their vehicle selection. These are sometimes in the form of packages or as part of an upgraded model of the basic vehicle. Some of this equipment and/or accessories may need to be operated or controlled by a switch. As a result the switches needed for the basic vehicle may not be the same as the switches needed for the basic vehicle to which one or more switch operated/controlled equipment/accessory has been added.

One solution is for the vehicle manufacturer to have different switch assemblies corresponding to the various possible equipment/accessories combinations and installing the one corresponding to the selected equipment/accessories. However, this requires the manufacturer to keep a large number of different switch assemblies in inventory.

Another solution is for the vehicle manufacturer to have a switch assembly providing the switches required by the basic vehicle (i.e. without any optional equipment/accessories) that is mounted to the handlebar, and to install separate switches corresponding to the selected equipment/accessories onto the vehicle separately from the switch assembly. However, this can clutter the vehicle, can lead to the switch not being in an easily accessible location and/or may not be aesthetically pleasing.

A similar problem occurs when the owner of a vehicle decides to add switch operated equipment/accessories after the delivery of their vehicle.

Therefore, there is a desire for a solution to the problems described above.

SUMMARY

It is an object of the present technology to ameliorate at least some of the inconveniences present in the prior art.

According to one aspect of the present technology, there is provided a vehicle having a frame, a vehicle body connected to the frame, a motor supported at least in part by the frame for powering the vehicle, at least one seat supported by the frame for receiving a rider thereon, a handlebar disposed at least in part forward of the seat for steering the vehicle, ands a switch assembly mounted to the handlebar. The switch assembly has a main housing mounted to the handlebar. The main housing has a first lateral side, a second lateral side opposite the first lateral side, a rear side, and a front side. The main housing defines a recess. The recess opens in the first lateral side and the rear side. The switch assembly also has one of: a cap selectively received in the recess; and a switch housing selectively received in the recess. The switch housing has a switch mounted thereto. The switch communicates with a component of the vehicle. The recess is configured for receiving the cap and for receiving the switch housing.

In some embodiments of the present technology, the switch is a first switch. A second switch is mounted to the main housing. The second switch communicates with another component of the vehicle.

In some embodiments of the present technology, the handlebar extends generally laterally through the main housing.

In some embodiments of the present technology, the first lateral side faces generally laterally inward.

In some embodiments of the present technology, a fastener fastens the one of the cap and the switch housing to the main housing.

In some embodiments of the present technology, the component is a winch connected to the frame, and the switch operates the winch.

In some embodiments of the present technology, the switch is a button having at least first and second positions.

In some embodiments of the present technology, the cap covers openings defined in the first lateral side and the rear side by the recess. The switch housing covers the openings.

In some embodiments of the present technology, the button faces generally rearward.

In some embodiments of the present technology, the one of the cap and the switch housing is inserted into the recess by sliding generally laterally into the recess from the first lateral side.

In some embodiments of the present technology, the main housing has generally laterally extending keys. The cap has generally laterally extending keyways configured to receive the keys. The switch housing has generally laterally extending keyways configured to receive the keys.

In some embodiments of the present technology, the one of the cap and the switch housing is inserted into the recess by sliding generally longitudinally into the recess from the rear side.

In some embodiments of the present technology, the main housing has generally longitudinally extending keys. The cap has generally longitudinally extending keyways configured to receive the keys. The switch housing has generally longitudinally extending keyways configured to receive the keys.

In some embodiments of the present technology, an electric wire is connected to the switch and extends partially inside the switch housing. When the one of the cap and the switch housing is the switch housing, the electric wire does not extend in an interior of the main housing.

In some embodiments of the present technology, the electric wire exits the switch housing via a lateral side of the switch housing corresponding to the first lateral side of the main housing.

In some embodiments of the present technology, the switch is a first switch, and a second switch is mounted to the switch housing.

In some embodiments of the present technology, a first electrical connector is connected to the main housing. An electric wire is connected to the first electrical connector and extends partially inside the main housing. A second electrical connector is connected to the switch housing and is electrically connected to the switch. When the one of the cap and the switch housing is the switch housing, the first electrical connector is connected to the second electrical connector for communicating the switch with the component of the vehicle.

In some embodiments of the present technology, the one of the cap and the switch housing is inserted into the recess by sliding into the recess. The first electrical connector connects to the second electrical connector by sliding the switch housing into the recess.

According to another aspect of the present technology, there is provided a switch assembly for mounting to a handlebar of a vehicle. The switch assembly has a main housing mounted to the handlebar. The main housing has a first lateral side, a second lateral side opposite the first lateral side, a rear side, and a front side. The main housing defines a recess. The recess opens in the first lateral side and the rear side. The switch assembly also has one of: a cap selectively received in the recess; and a switch housing selectively received in the recess. The switch housing has a switch mounted thereto. The switch is configured for communicating with a component of the vehicle. The recess is configured for receiving the cap and for receiving the switch housing.

In some embodiments of the present technology, the switch is a first switch. A second switch is mounted to the main housing. The second switch is configured for communicating with another component of the vehicle.

In some embodiments of the present technology, the main housing defines a passage adapted for receiving the handlebar generally laterally through the main housing.

In some embodiments of the present technology, a fastener fastens the one of the cap and the switch housing to the main housing.

In some embodiments of the present technology, the cap covers openings defined in the first lateral side and the rear side by the recess, and the switch housing covers the openings.

In some embodiments of the present technology, the one of the cap and the switch housing is inserted into the recess by sliding generally longitudinally into the recess from the rear side.

In some embodiments of the present technology, the main housing has generally longitudinally extending key. The cap has generally longitudinally extending keyways configured to receive the keys. The switch housing has generally longitudinally extending keyways configured to receive the keys.

In some embodiments of the present technology, the switch is a first switch, and a second switch is mounted to the switch housing.

In some embodiments of the present technology, a first electrical connector is connected to the main housing. An electric wire is connected to the first electrical connector and extends partially inside the main housing. A second electrical connector is connected to the switch housing and is electrically connected to the switch. When the one of the cap and the switch housing is the switch housing, the first electrical connector is connected to the second electrical connector for communicating the switch with the component of the vehicle.

In some embodiments of the present technology, the one of the cap and the switch housing is inserted into the recess by sliding into the recess. The first electrical connector connects to the second electrical connector by sliding the switch housing into the recess.

For purposes of the present application, terms related to spatial orientation when referring to a vehicle and components in relation to the vehicle, such as "vertical", "horizontal", "forward", "rearward", "left", "right", "above" and "below", are as they would be understood by a driver of the vehicle sitting thereon in an upright driving position, with the vehicle steered straight-ahead and being at rest on flat, level ground.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with reference to a four-wheeled straddle-seat all-terrain vehicle (ATV) 10. It is contemplated that the present technology may be used with other vehicles steered via a handlebar such as snowmobiles, motorcycles and three-wheeled on-road vehicles.

Figure 1:
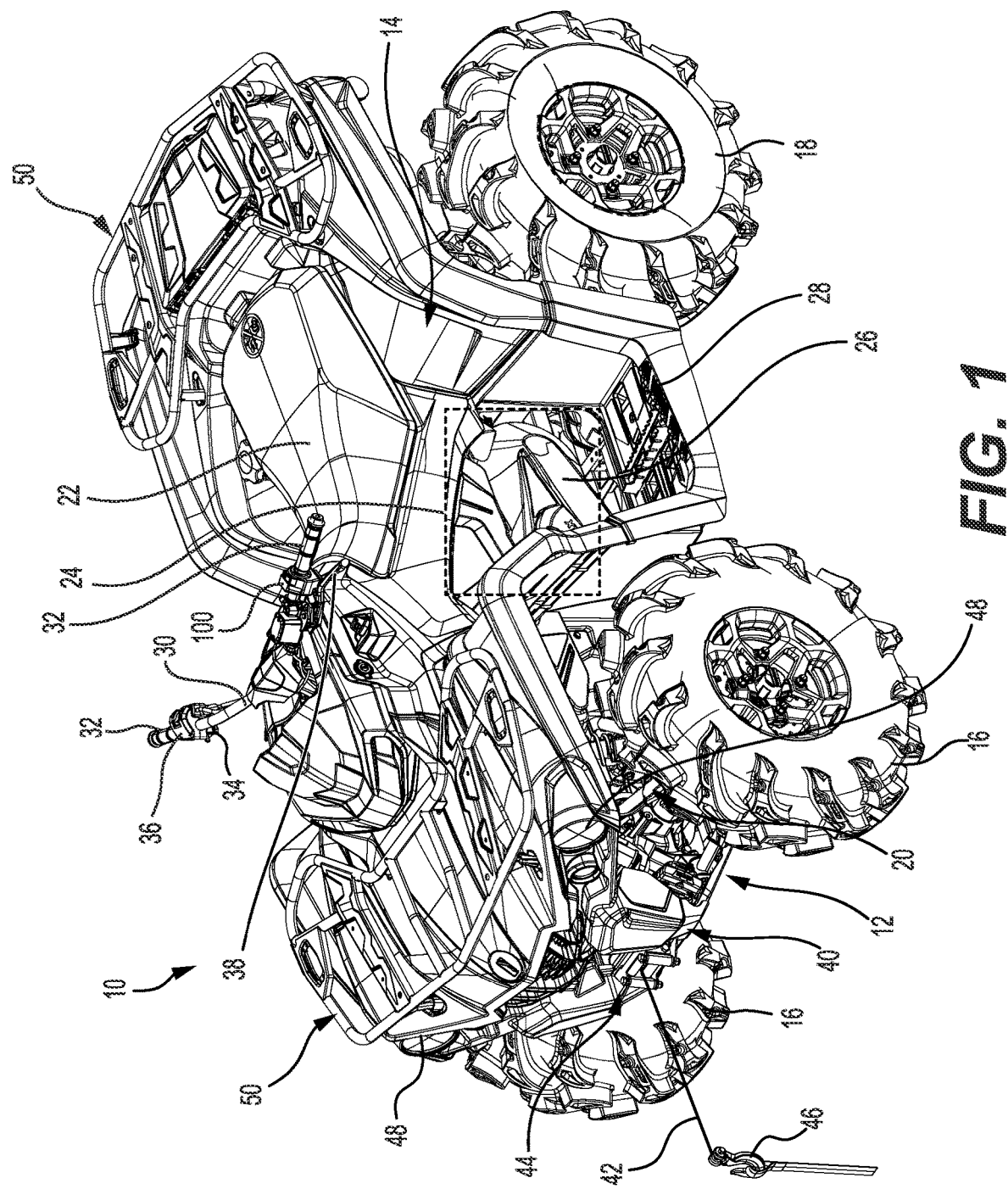
FIG. 1 is a perspective view taken from a front, left side of an all-terrain vehicle (ATV)

Referring to FIG. 1, the ATV 10 has a frame 12 and a vehicle body 14 mounted to the frame 12. The ATV 10 has two front wheels 16 and two rear wheels 18 connected to the frame 12 via corresponding suspension assemblies 20 (only a front left one of which is partially shown in FIG. 1). Each of the four wheels 16, 18 is provided with a low-pressure balloon tire adapted for off-road conditions. It is contemplated that the ATV 10 could have six wheels or only three wheels.

The ATV 10 has a straddle seat 22 connected to the frame 12 for accommodating a driver of the ATV 10. A motor 24, schematically shown in FIG. 1, is connected to the frame 12. The motor 24 drives the front and rear wheels 16, 18. It is contemplated that the motor could drive only the front wheels 16 or only the rear wheels 18. In the present embodiment, the motor 24 is an internal combustion engine. It is contemplated that the motor 24 could be replaced by an electric motor or a hybrid propulsion unit (i.e. an internal combustion engine and an electric motor). The motor 24 is disposed under the straddle seat 22. The wheels 16, 18 are operatively connected to the motor 24 via a continuously variable transmission (CVT) 26.

Footrests 28 are laterally provided on either side of the straddle seat 22 and are disposed vertically lower than the straddle seat 22 to support the driver's feet. The footrests 28 are connected to the frame 12. A steering assembly, including a handlebar 30, is rotationally connected the frame 12. The handlebar 30 is connected to a steering column assembly (not shown) for actuating steering linkages (not shown) operatively connected to the front wheels 16 for steering the front wheels 16. Hand grips 32 are disposed on the ends of the handlebar 30.

A throttle operator 34, in the form of a thumb-actuated throttle lever, is mounted to a right side of the handlebar 30 to control a speed of the motor 24. Other types of throttle operators, such as a finger-actuated throttle lever and a twist grip, are also contemplated. A switch assembly 36 is mounted to the right side of the handlebar 30 near the right hand grip 32. The switch assembly 36 has a number of switches for controlling various features and components of the ATV 10. A brake lever 38 is mounted to a left side of the handlebar 30. A switch assembly 100 is mounted to the left side of the handlebar 30 near the left hand grip 32. The switch assembly 100 will be described in more detail below.

The ATV 10 has a winch 40 connected to the frame 12 at a front thereof. The winch 40 includes a winch motor (not shown), selectively driving a spool (not shown) around which a winch cable 42 is wound. The winch cable 42 passes through alignment rollers 44. A hook 46 is connected to the end of the winch cable 42. As will be described below, the winch 40 is an optional component of the ATV 10 and may not be provided in some embodiments of the ATV 10.

The ATV 10 has headlights 48 and taillights (not shown). Front and rear cargo racks 50 are provided over the vehicle body 14 at the front and rear of the ATV 10. The ATV 10 further includes other components such as brakes, a fuel tank, an air intake system and an exhaust system. As it is believed that these components would be readily recognized by one of ordinary skill in the art, further explanation and description of these components will not be provided herein.

Figure 5:
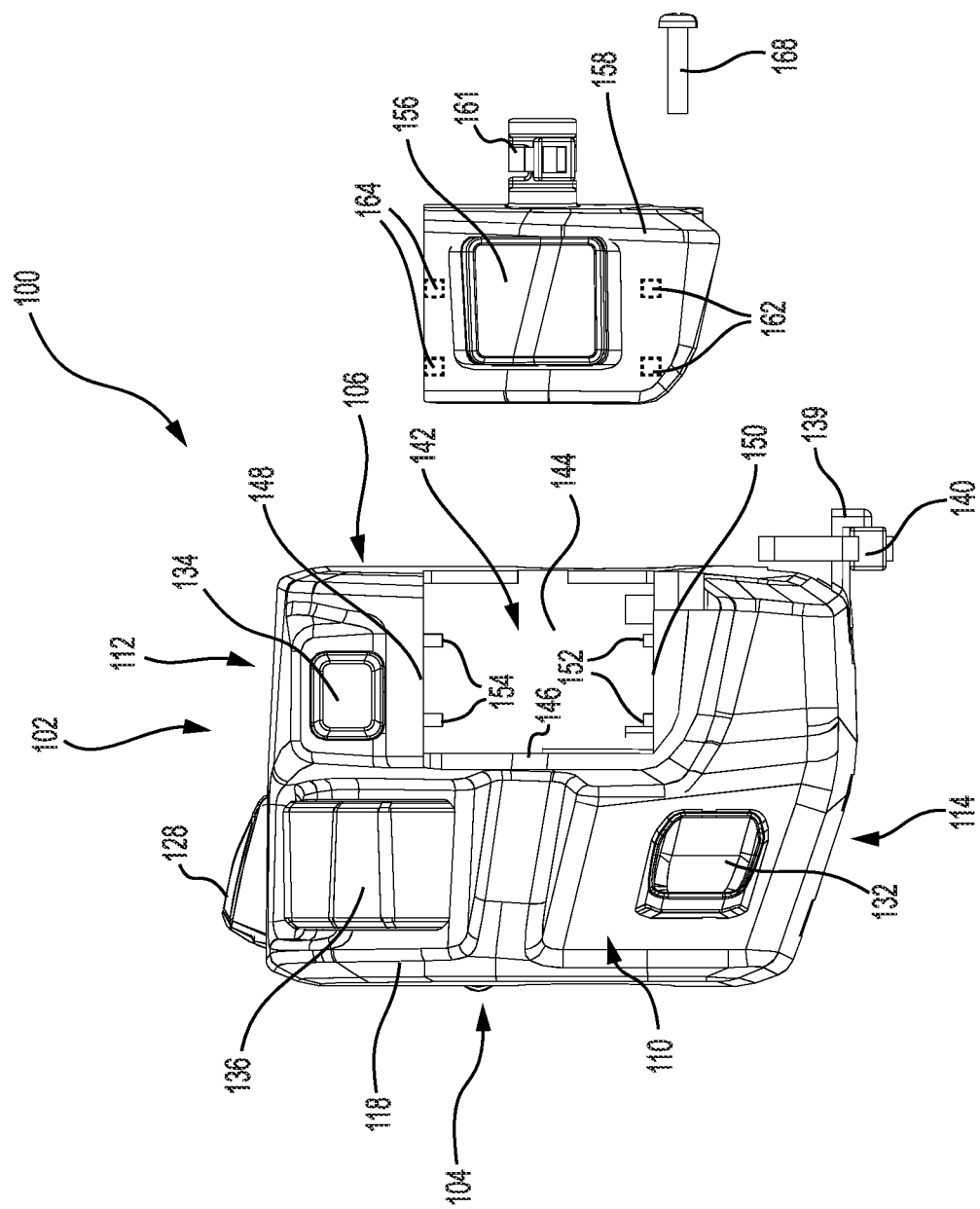
FIG. 5 is a partially exploded rear view of the switch assembly of FIG. 2.
Figure 6:
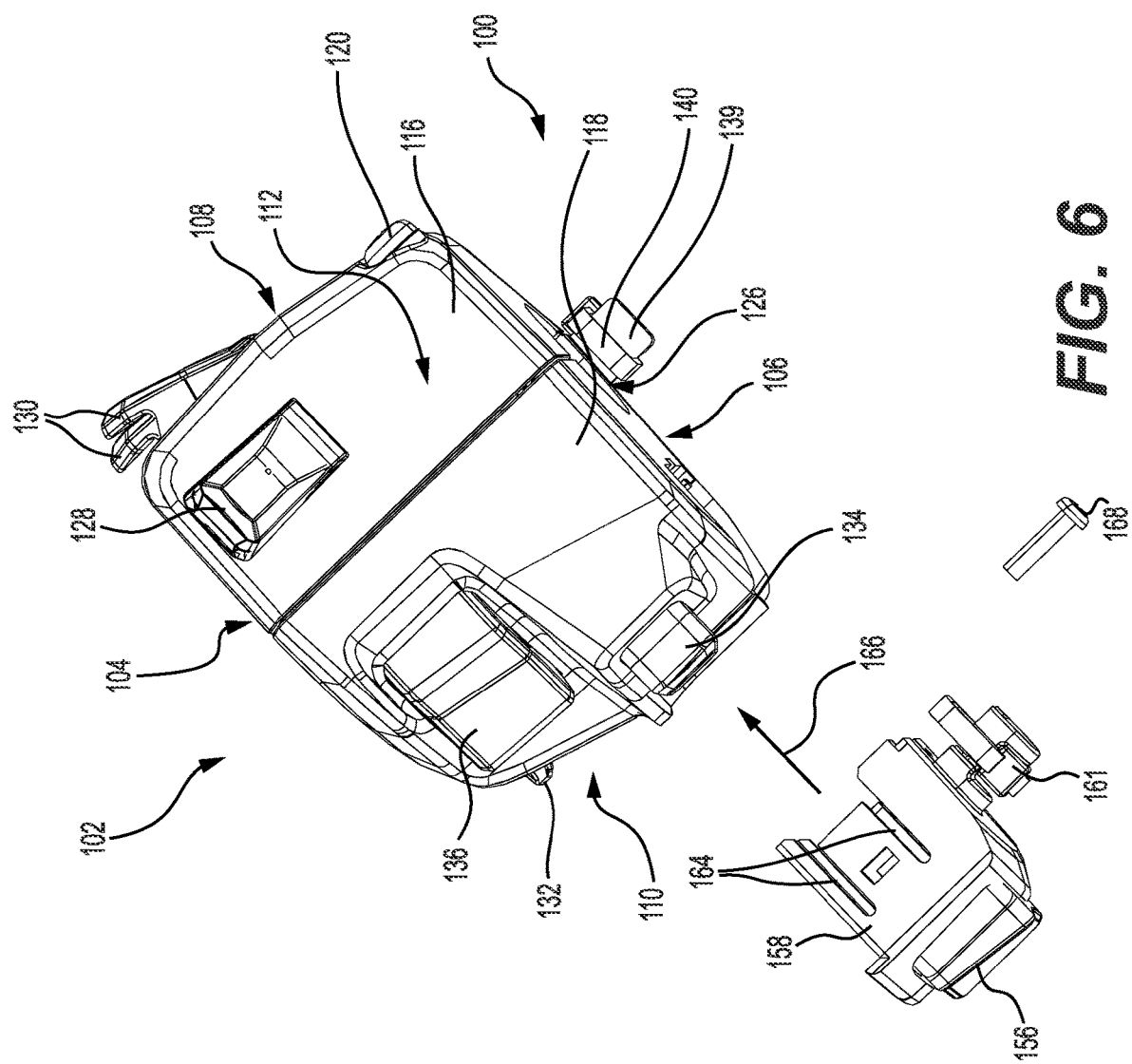
FIG. 6 is a partially exploded top view of the switch assembly of FIG. 2.
Figure 7:
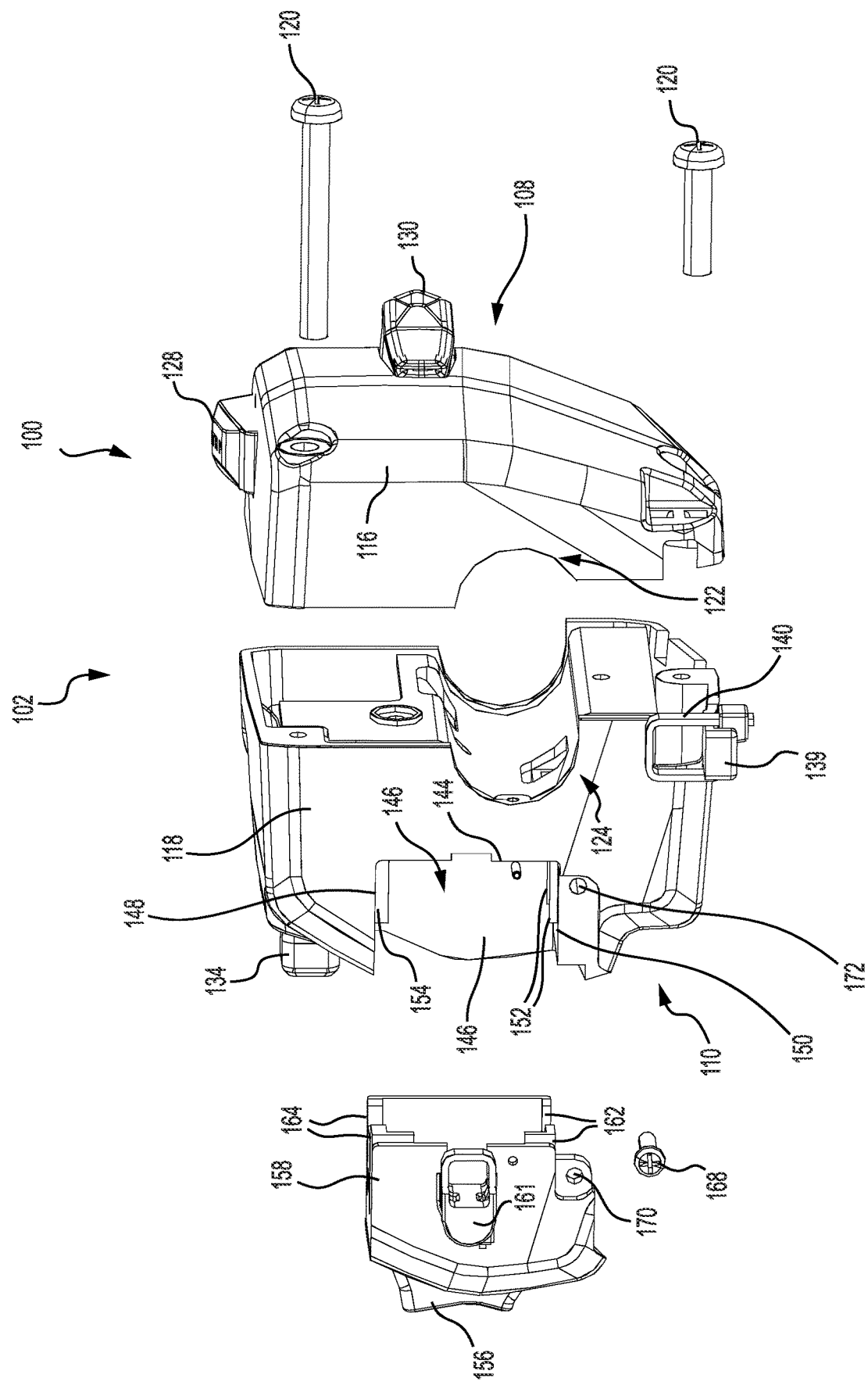
FIG. 7 is partially exploded perspective view, taken from a front, right side of the switch assembly of FIG. 2.

Turning now to FIGS. 2 to 7, the switch assembly 100 will be described in more detail. The switch assembly 100 has a main housing 102 having left 104, right 106, front 108, rear 110, top 112 and bottom 114 sides. As seen in FIG. 7, the main housing 102 is made of a front housing portion 116 and a rear housing portion 118 that are connected each other by fasteners 120. The front housing portion 116 defines a semi-circular channel 122. Similarly, the rear housing portion 118 defines a semi-circular channel 124. When the front housing portion 116 is connected to the rear housing portion 118, the channels 122, 124 define cylindrical passage 126 through which the handlebar 30 extends generally laterally to mount the main housing 102 to the handlebar 30. It is contemplated that in alternative embodiments, the main housing 102 could be one integral component. It is also contemplated that the main housing 102 could be made of more than two portions.

The main housing 102 has a number of switches mounted thereto. A speed limiter ON/OFF switch 128 is mounted to the front housing portion 116 on the top side 112 of the main housing 102. Speed limiter set and reset switches 130 (see FIGS. 4 and 6) are mounted to the front housing portion 116 on the front side 108 of the main housing 102. The speed limiter ON/OFF switch 128 turns a vehicle speed limiting function of the ATV 10, and the speed limiter set and reset switches 130 set and reset the speed associated with the speed limiting function respectively. A run and stop switch 132 is mounted to the rear housing portion 118 on the rear side 110 of the main housing 102. The run and stop switch 132 has a run position and a stop position. The ATV 10 is not operable when the run and stop switch 132 is in the stop position. If the ATV 10 is to be operated, the run and stop switch 132 must be in the run position. A start and override switch 134 is mounted to the rear housing portion 118 on the rear side 110 of the main housing 102. When the run and stop switch 132 is in the run position, the start and override switch 134 may be pushed to start the ATV 10. In some operating conditions, such as when the ATV 10 is in reverse, the ATV 10 speed is limited. The driver may override this speed limit by pushing the start and override switch 134. A headlight switch 136 is mounted to the rear housing portion 118 on the rear side 110 of the main housing 102, above the run and stop switch 132 and to the left of the start and override switch 134. The headlight switch 136 controls the headlights 48 of the ATV 10 between an off mode, a low-beam mode, a high beam mode. It is contemplated that the above switches could be disposed differently than illustrated, that some of these switches may be omitted and that other switches controlling other aspects of the ATV 10 could be mounted to the main housing 102.

The switches mounted to the main housing 102 are connected to a cable 138 (FIGS. 2 and 3) that communicates signals from the switches to a control unit (not shown) of the ATV 10. One end of the cable 138 is disposed inside the main housing 102, the cable 138 exits the main housing 102 via a grommet (not shown) provided on the rear housing portion 118, on the lower right side 106 of the main housing 102, and the portion of the cable 138 exiting the main housing 102 is fastened to a tab 139 by a tie-wrap 140.

With reference to FIGS. 5 and 7, it can be seen that the main housing 102 defines a recess 142. More specifically, the recess 142 is defined in the rear housing portion 118 at the rear, right corner of the main housing 102, below the start and override switch 134. As such, the recess 142 has a front wall 144, a left wall 146, a top wall 148 and a bottom wall 150 and the recess 142 opens into the right side 106 and the rear side 110 of the main housing 102. The recess 142 does not communicate with an interior of the main housing 102 (i.e. the volume defined between the front and rear housing portions 116, 118). It is contemplated that in another alternative embodiment the recess 142 could be defined in the rear housing portion 118 at the rear, left corner of the main housing 102. It is also contemplated that in other alternative embodiments the recess 142 could additionally open in the top side 112 or the bottom side 114. These embodiments include a recess 142 defined at the top, rear, left corner of the main housing 102; at the top, rear, right corner of the main housing 102; at the bottom, rear, left corner of the main housing 102; or at the bottom, rear, right corner of the main housing 102.

A pair of generally longitudinally extending keys 152 are provided on the bottom wall 150 of the recess 142. Another pair of generally longitudinally extending keys 154 are provided on the top wall 148 of the recess 142. The keys 152, 154 are generally longitudinally extending bands protruding from the walls 150, 148. It is contemplated that more or less keys 152, 154 could be provided. It is also contemplated that one or more keys could be provided on the left wall 146. Other types of keys 152, 154 are contemplated, such as dovetails for example.

Figure 2:
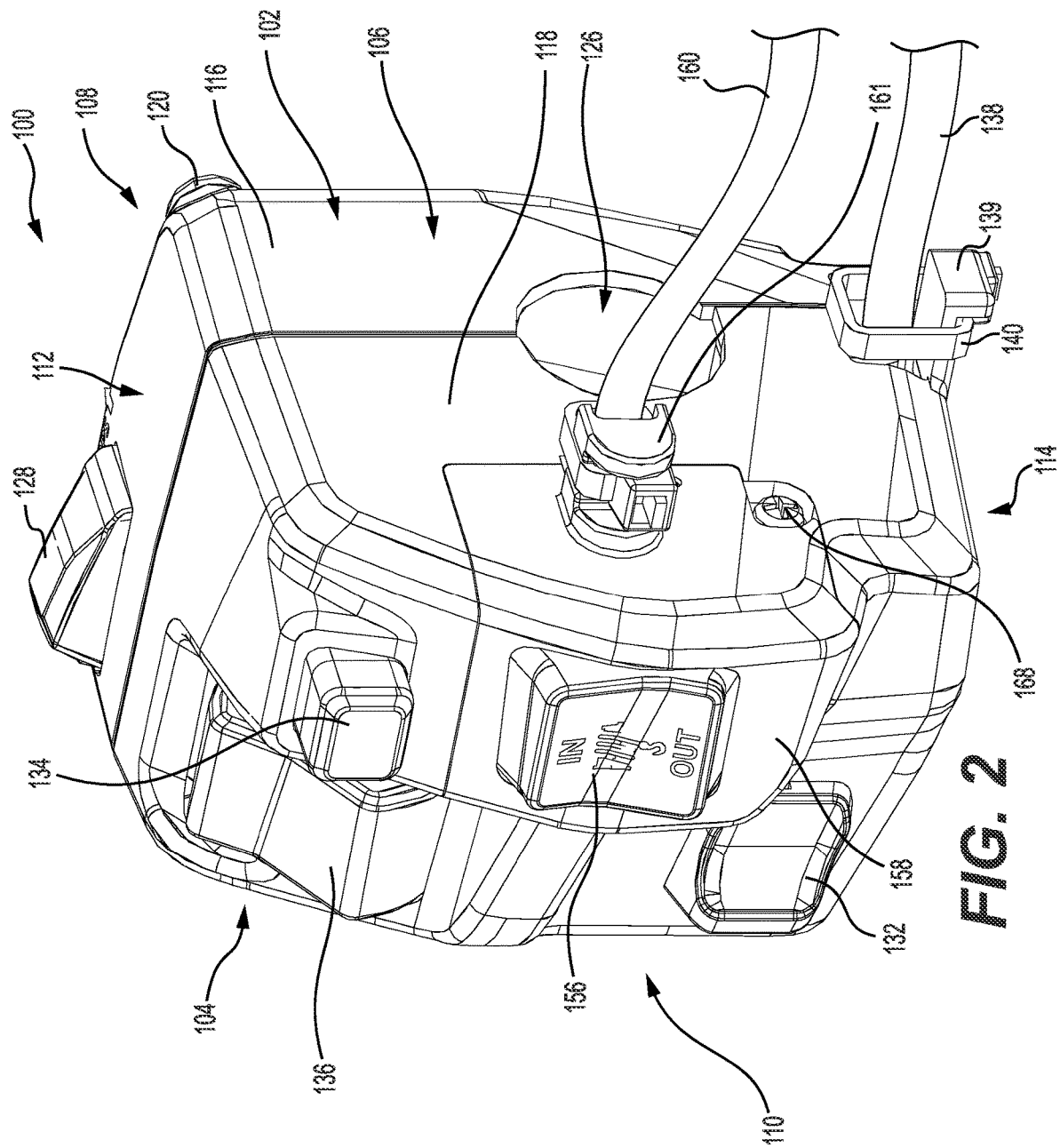
FIG. 2 is a perspective view taken from a rear, right side of a left switch assembly of the ATV of FIG. 1 having a winch switch.
Figure 3:
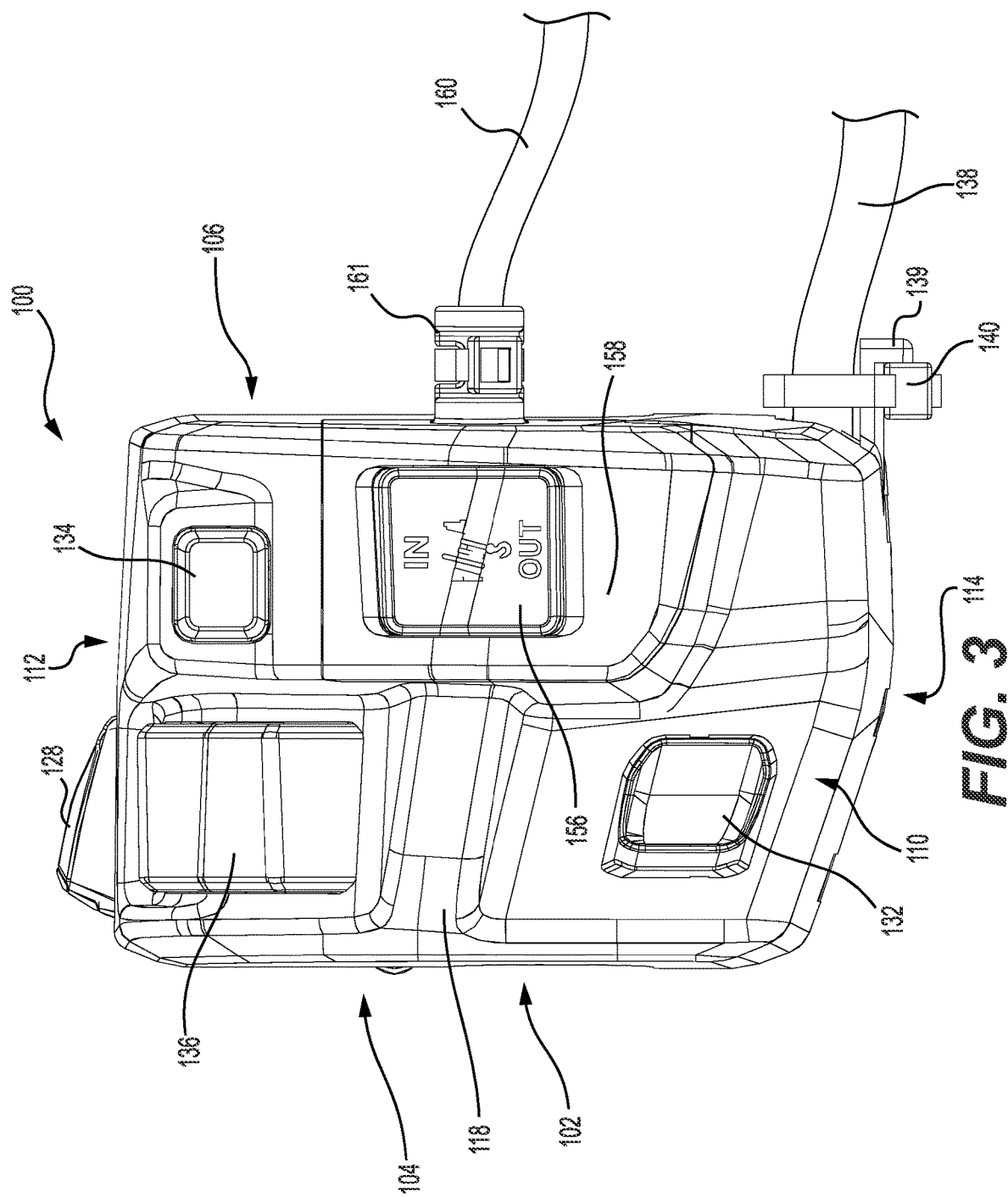
FIG. 3 is a rear view of the switch assembly of FIG. 2.
Figure 4:
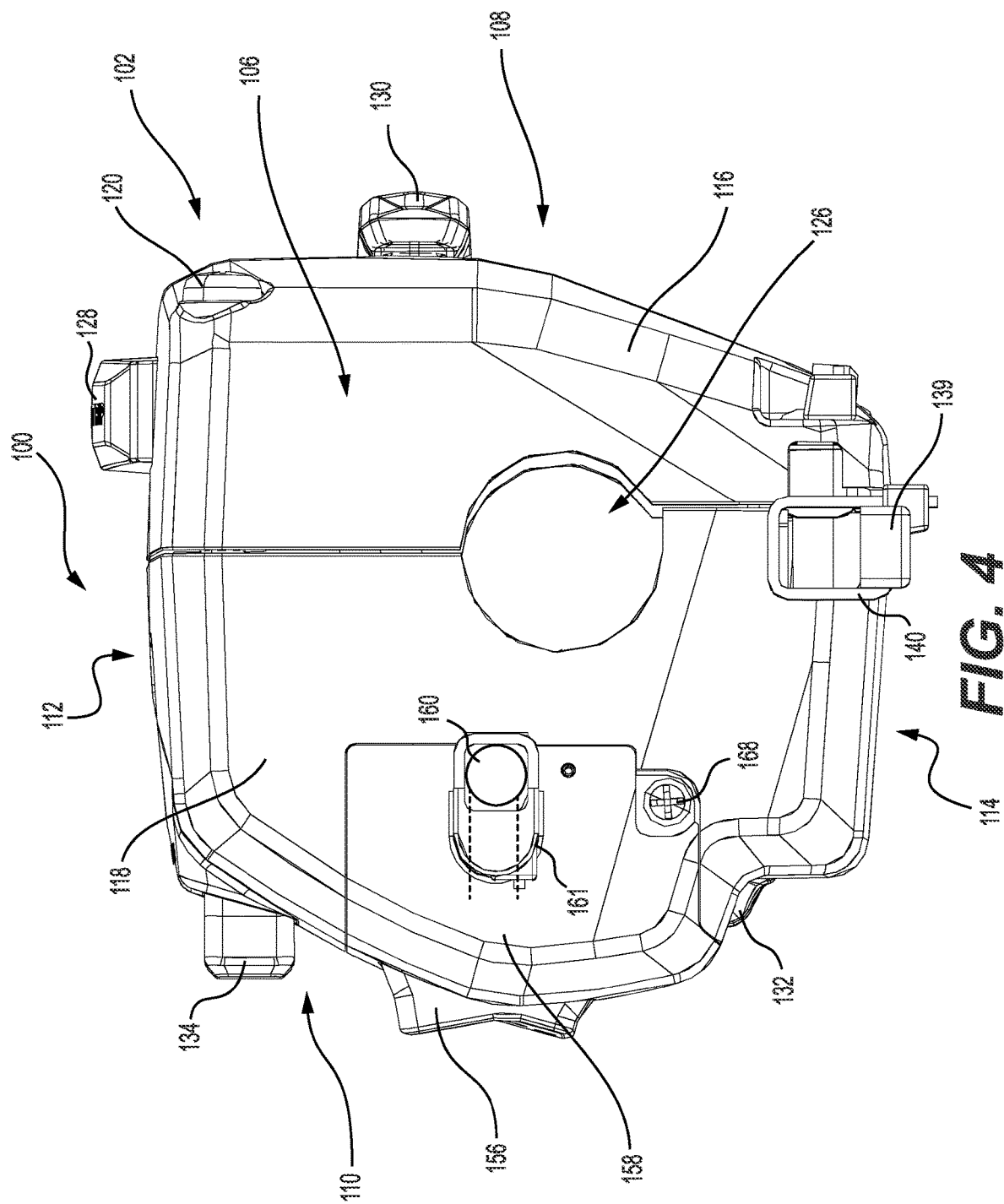
FIG. 4 is a right side view of the switch assembly of FIG. 2.

As the ATV 10 illustrated in FIG. 1 is provided with a winch 40, a winch switch 156 is provided. The winch switch 156 is mounted to a switch housing 158. The switch housing 158 is received in the recess 142 as can be seen in FIGS. 2 to 4 and as will be described in more detail below. It is contemplated that in alternative embodiments, a switch used to control another optional equipment or accessory of the ATV 10 could be mounted to the switch housing 158 in addition to or instead of the winch switch 156. For example, should the ATV 10 be equipped with heated hand grips 32, the switch provided on the switch housing 158 could be a hand grip heating ON/OFF switch used to turn the heating of the hand grips 32 ON and OFF. Other examples of an optional equipment or accessory of the ATV that could be controlled by a switch mounted to the switch housing 158 include, but are not limited to, fog lights and an adjustable windshield. It is contemplated that in embodiments where additional switches are provided on the switch housing 158, the switch housing 158 could be wider than illustrated in order to accommodate the additional switches. In such embodiments, the wider switch housing 158, when installed in the recess 142, would extend laterally outward of the right side 106 of the main housing 102.

The winch switch 156 is connected to an electric wire 160 that extends inside the switch housing 158, as shown in dotted lines in FIGS. 3 and 4, and exits the switch housing 158 through a grommet 161 provided on the right side of the switch housing 158. The electric wire 160 is connected to the winch motor of the winch 40 to control the operation of the winch 40.

The winch switch 156 is a button having a reel-out position, a neutral position and a reel-in position. When the winch switch 156 is in the reel-out position, the winch cable 42 is reeled out from its initial position. When the winch switch 156 is in the neutral position, the winch cable 42 is not being actively being reeled-in or reeled-out. When the winch switch 156 is in the reel-in position, the winch motor reels-in the winch cable 42.

With reference to FIGS. 5 to 7, the switch housing 158 has a pair of generally longitudinally extending keyways 162 provided near a bottom thereof. Another pair of generally longitudinally extending keyways 164 are provided at the top of the switch housing 158. The keyways 162, 164 are generally longitudinally extending slots configured to receive the keys 152, 154 respectively. It is contemplated that the keyways 162, 164 could be generally longitudinally extending channels. It is contemplated that in embodiments where more or less keys 152, 154 are provided, the switch housing 158 would have a corresponding number of keyways 162, 164. It is also contemplated that in embodiments where one or more keys are provided on the left wall 146, the switch housing 158 would have a corresponding number of keyways provide on its left side. It is contemplated that in embodiments where keys 152, 154 of a type other than the one illustrated, the housing 158 would be provided with keyways 162, 164 configured to receive these keys 152, 154. It is also contemplated that the main housing 102 could define keyways in one or more walls of the recess 142 and that the switch housing 158 could be provided with one or more keys configured to be received in these keyways. It is also contemplated that in some embodiments, the keys 152, 154 and the keyways 162, 164 could be omitted.

As shown by arrow 166 in FIG. 6, the switch housing 158 is inserted into the recess by sliding generally longitudinally into the recess 142 from the rear side 110 by engaging the keys 152, 154 into the keyways 162, 164. Once the switch housing 158 is inserted in the recess 142, the switch housing 158 is fastened to the rear housing portion 118 by a threaded fastener 168. The fastener 168 is inserted through an aperture 170 defined on a right side of the switch housing 158 and a corresponding threaded aperture 172 defined in the rear housing portion 118 (see FIG. 7). It is contemplated that the switch housing 158 could be connected to the main housing 102 in other ways. For example, the switch housing 158 could be clipped to the main housing 102. In another example, one of the walls of the recess 142 or the switch housing 158 could have a ferromagnetic metal plate mounted thereto, and the other of the one wall of the recess 142 and the switch housing 158 could be provided with a permanent magnet such that the switch housing 158 is magnetically connected to the main housing 102.

When the switch housing 158 is connected to the main housing 102, the winch switch 156 faces generally rearward. The electric wire 160 does not extend in the interior of the main housing 102. As can be seen in FIGS. 2 to 4, the shape of the switch housing 158 is complementary to the shape of the main housing 102 such that the switch housing 158 covers the openings defined in the right and rear sides 106, 110 of the main housing 102. In the present embodiment, the combination of the main housing 102 and the switch housing 158 give a visual appearance of a single housing even though two housings 102, 158 are used.

Figure 8:
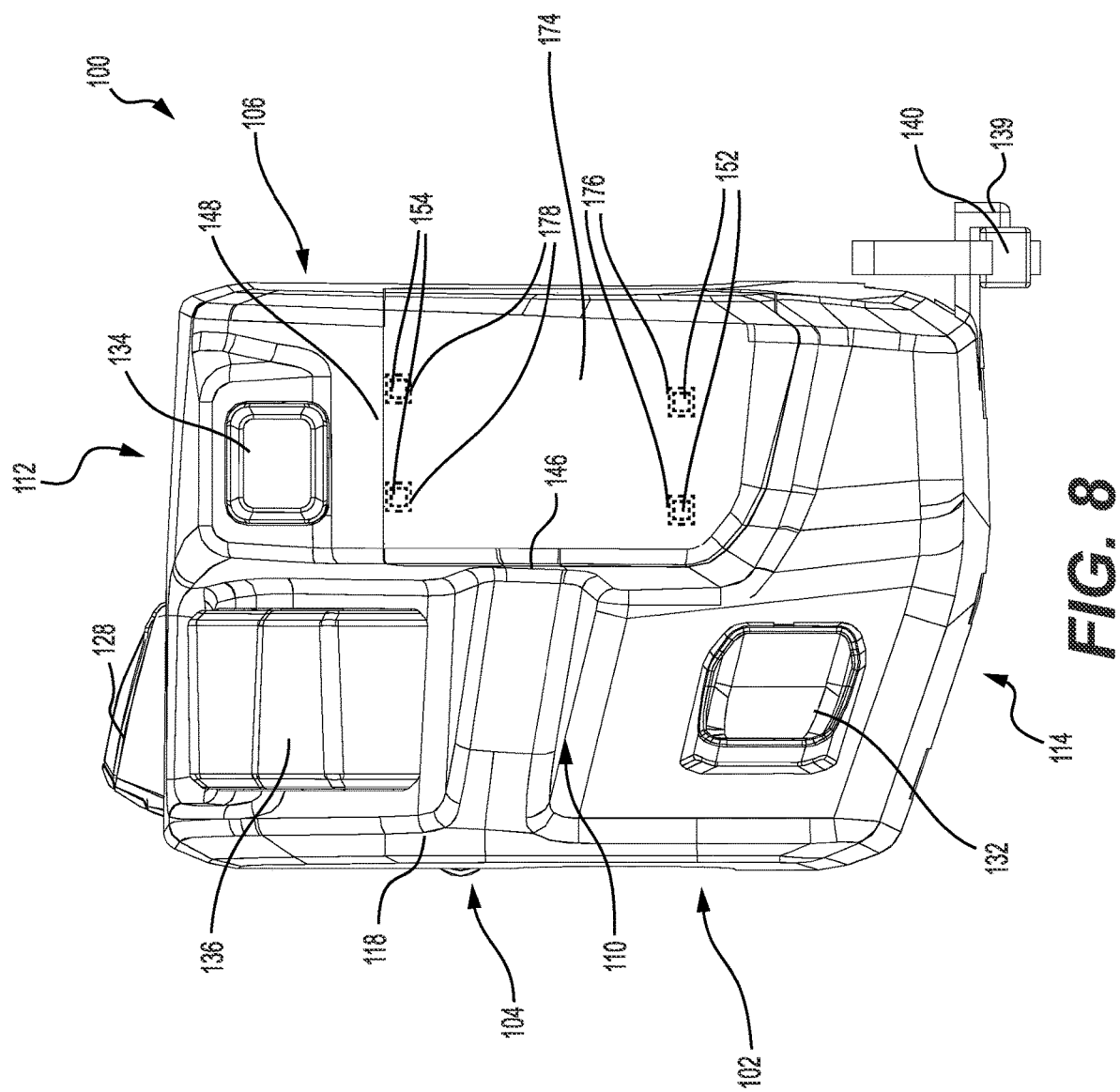
FIG. 8 is a rear view of the switch assembly of FIG. 2 with the winch switch having been replaced by a cap.

When the ATV 10 is not provided with the winch 40, which is an optional accessory of the ATV 10, the winch switch 156 is not needed. Instead of having to provide a completely different switch assembly that does not have the winch switch 156 as in the prior art, the switch housing 158 and the winch switch 156 are replaced by a cap 174 that covers the recess 142, as can be seen in FIG. 8. Similarly, when the ATV 10 is not initially provided with the winch 40, but the winch 40 is installed later, the cap 174 is removed and replaced with the switch housing 158 and the winch switch 156.

Figure 9:
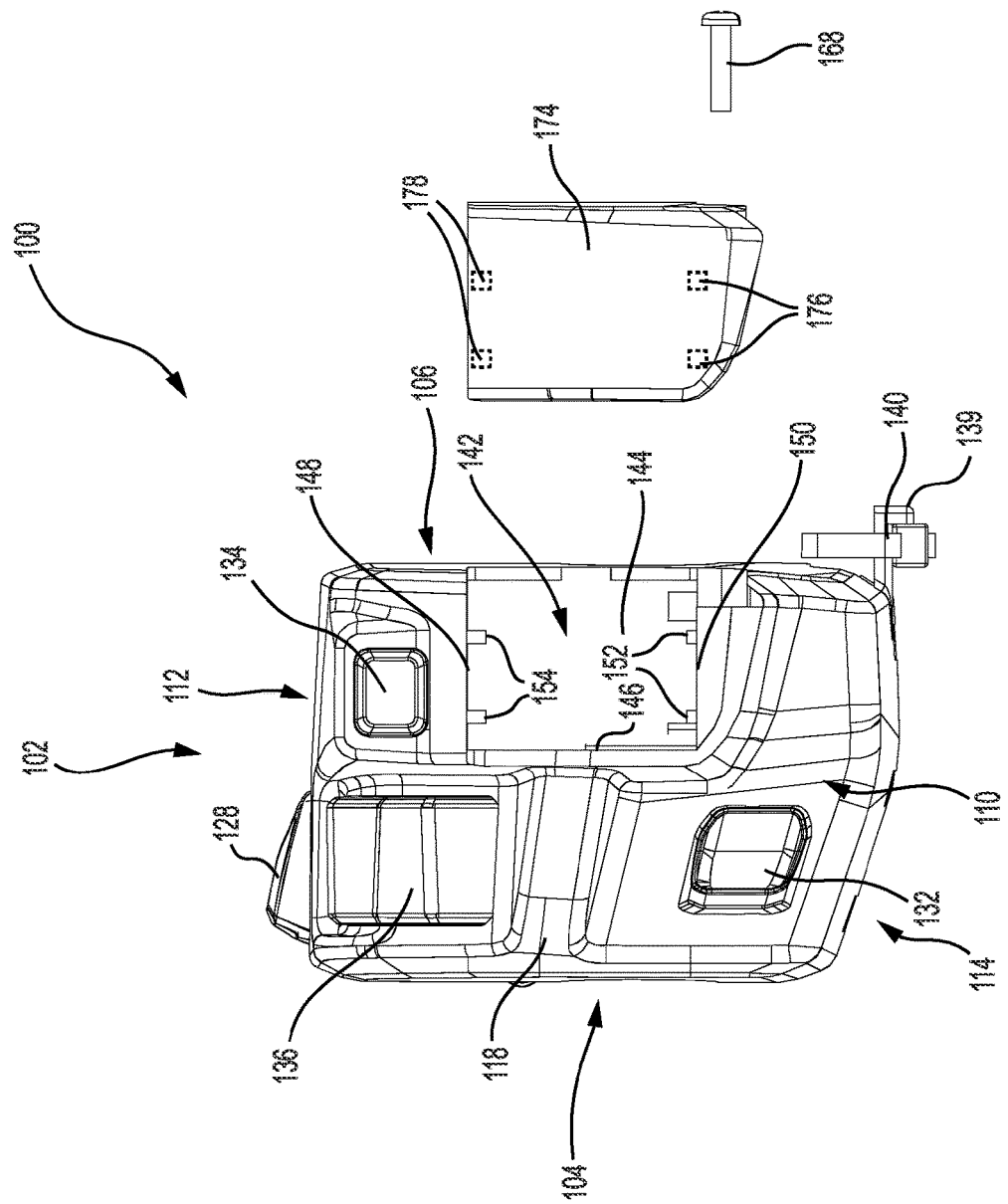
FIG. 9 is a partially exploded rear view of the switch assembly of FIG. 8.

In the present embodiment, as can be seen in FIGS. 8 and 9, the cap 174 has essentially the same shape as the switch housing 158, except that the cap 174 does not have the apertures for the winch switch 156 and the grommet 161 that the switch housing 158 defines. Like the switch housing 158, the cap 174 has a pair of generally longitudinally extending keyways 176 provided near a bottom thereof and another pair of generally longitudinally extending keyways 178 provided at the top thereof. The keyways 176, 178 are generally longitudinally extending slots configured to receive the keys 152, 154 respectively. It is contemplated that the keyways 176, 178 could be generally longitudinally extending channels.

Like the switch housing 158, the cap 174 is inserted into the recess by sliding generally longitudinally into the recess 142 from the rear side 110 by engaging the keys 152, 154 into the keyways 176, 178. Once the cap 174 is inserted in the recess 142, the cap 174 is fastened to the rear housing portion 118 by the threaded fastener 168. The fastener 168 is inserted through an aperture defined on a right side of the cap 174 (not shown, but like the aperture 170 of the switch housing 158) and the threaded aperture 172 defined in the rear housing portion 118.

As can be seen in FIG. 8, the shape of the cap 174 is complementary to the shape of the main housing 102 such that the cap 174 covers the openings defined in the right and rear sides 106, 110 of the main housing 102. In the present embodiment, the cap 174 hides the recess 142.

Figure 10:
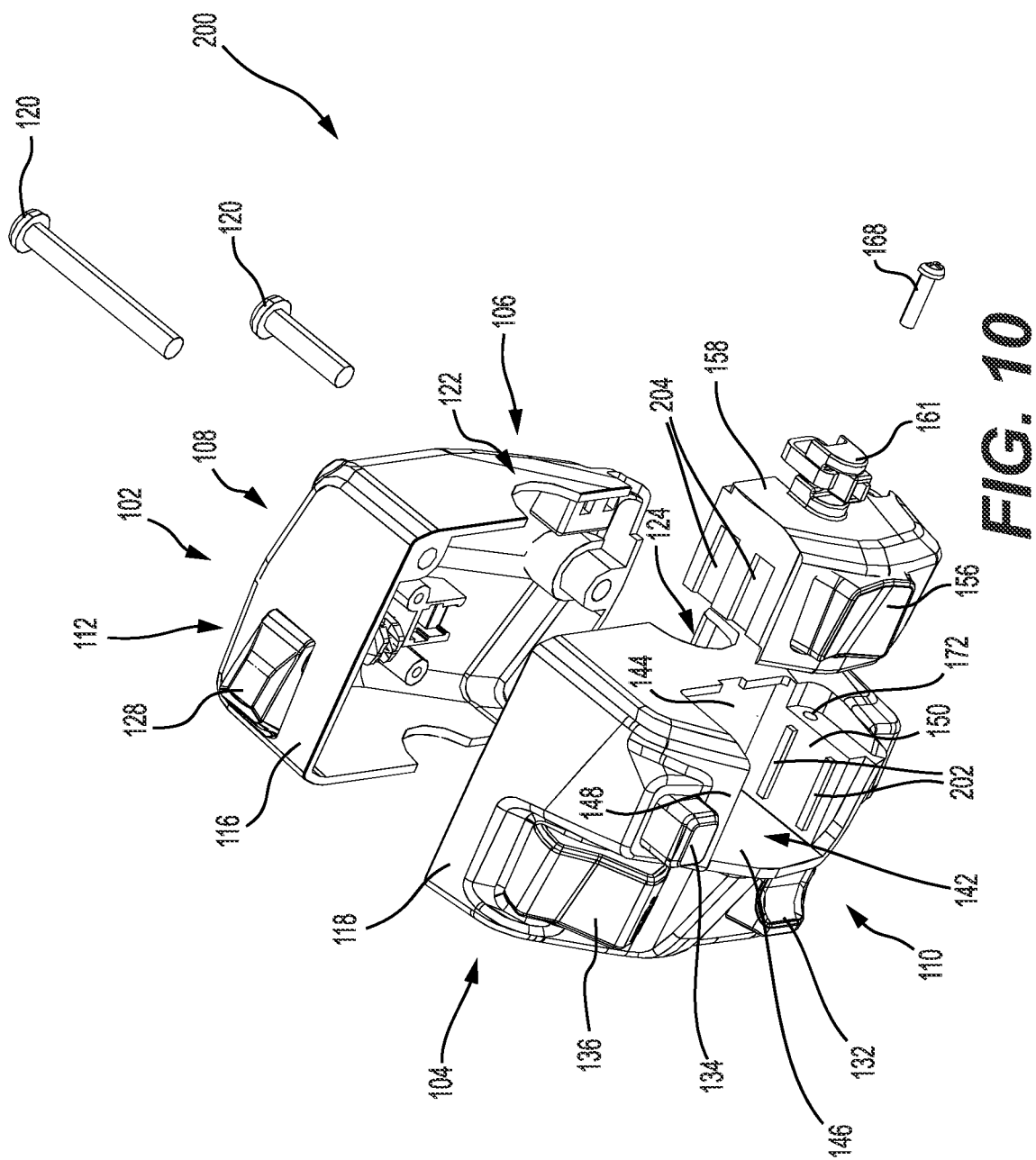
FIG. 10 is a partially exploded perspective view, taken from a rear, right side of an alternative embodiment of the switch assembly of FIG. 2.

FIG. 10 illustrates a switch assembly 200 which is an alternative embodiment of the switch assembly 100. For simplicity, elements of the switch assembly 200 that correspond to those of the switch assembly 100 have been labeled with the same reference numerals and will not be described again.

Figure 11:
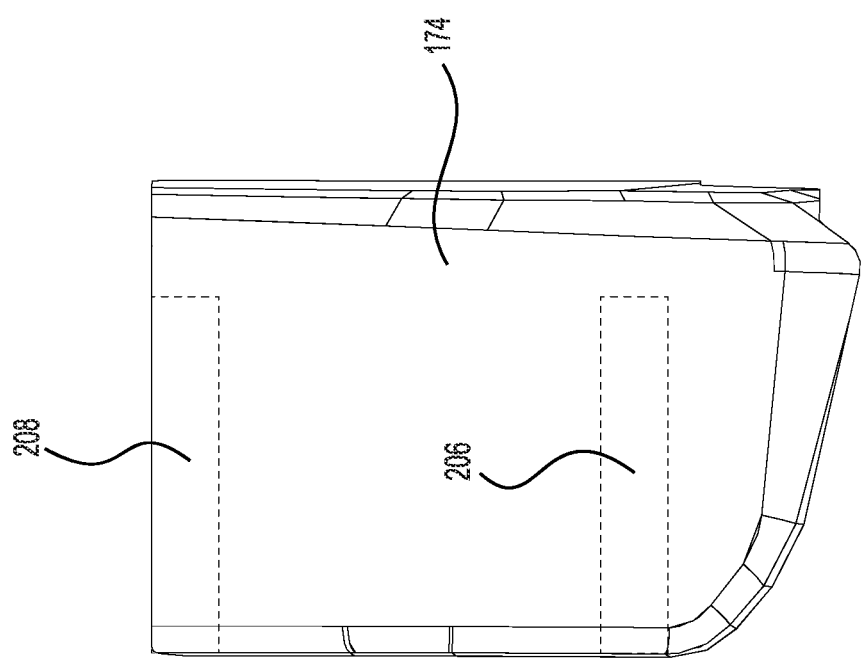
FIG. 11 is a rear view of a cap to be used with the switch assembly of FIG. 10.

In the switch assembly 200, the generally longitudinally extending keys 152, 154 have been replaced by generally laterally extending keys (only the lower pair of keys 202 being shown). Accordingly, the generally longitudinally extending keyways 162, 164 of the switch housing 158 have been replaced by generally laterally extending keyways (only the upper keyways 204 being shown). In this embodiment, the keyways of the switch housing 158 are channels, but it is contemplated that they could be slots. Similarly, with reference to FIG. 11, the generally longitudinally extending keyways 176, 178 of the cap 174 have been replace by generally laterally extending keyways 206, 208. The selected one of the switch housing 158 and the cap 174 is inserted into the recess 142 by sliding it generally laterally into the recess 142 from the right side 106 of the main housing 102, such that the keys are received in the keyways.

Figure 12:
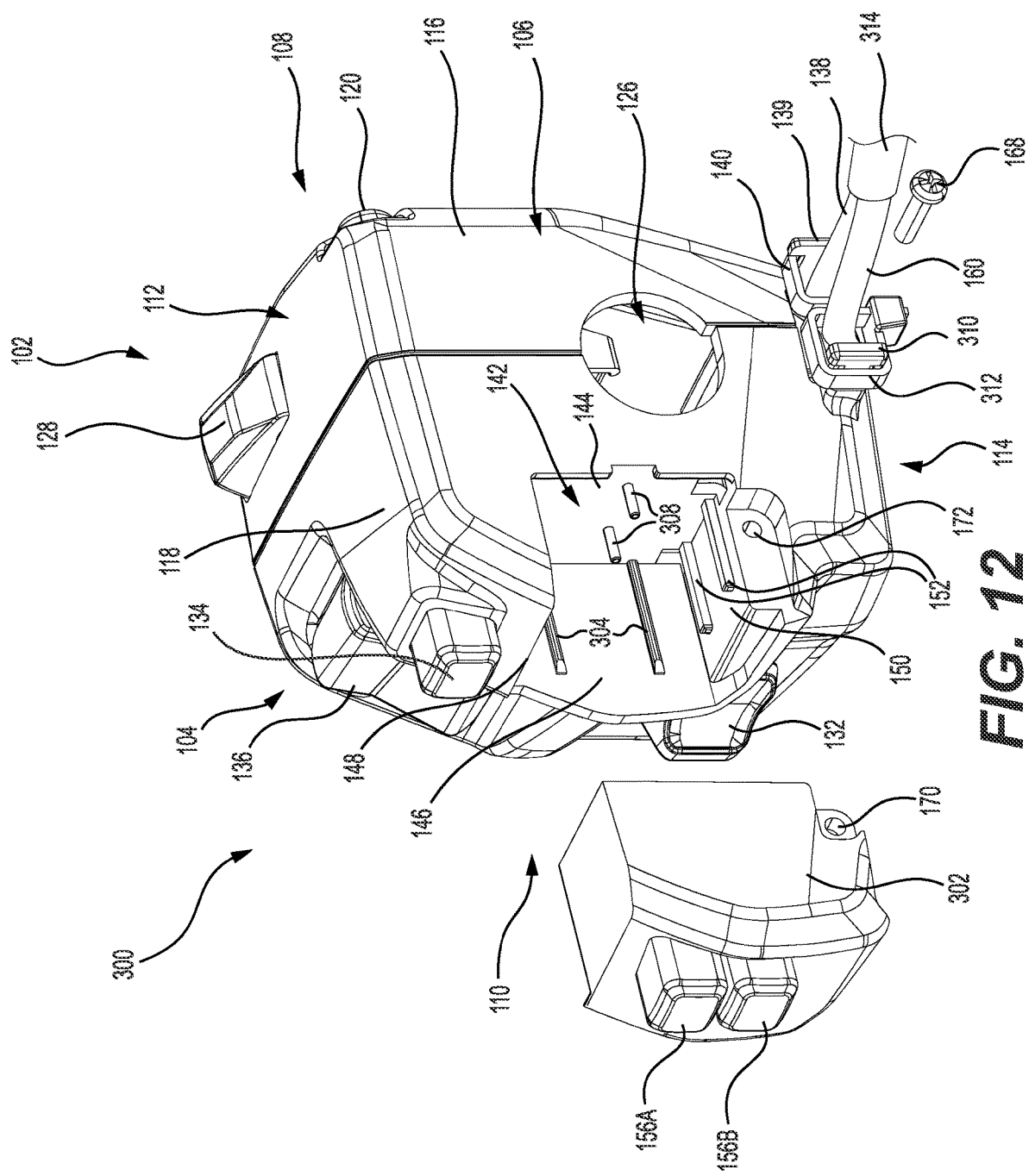
FIG. 12 is a partially exploded perspective view, taken from a rear, right side of an alternative embodiment of the switch assembly of FIG. 2.
Figure 13:
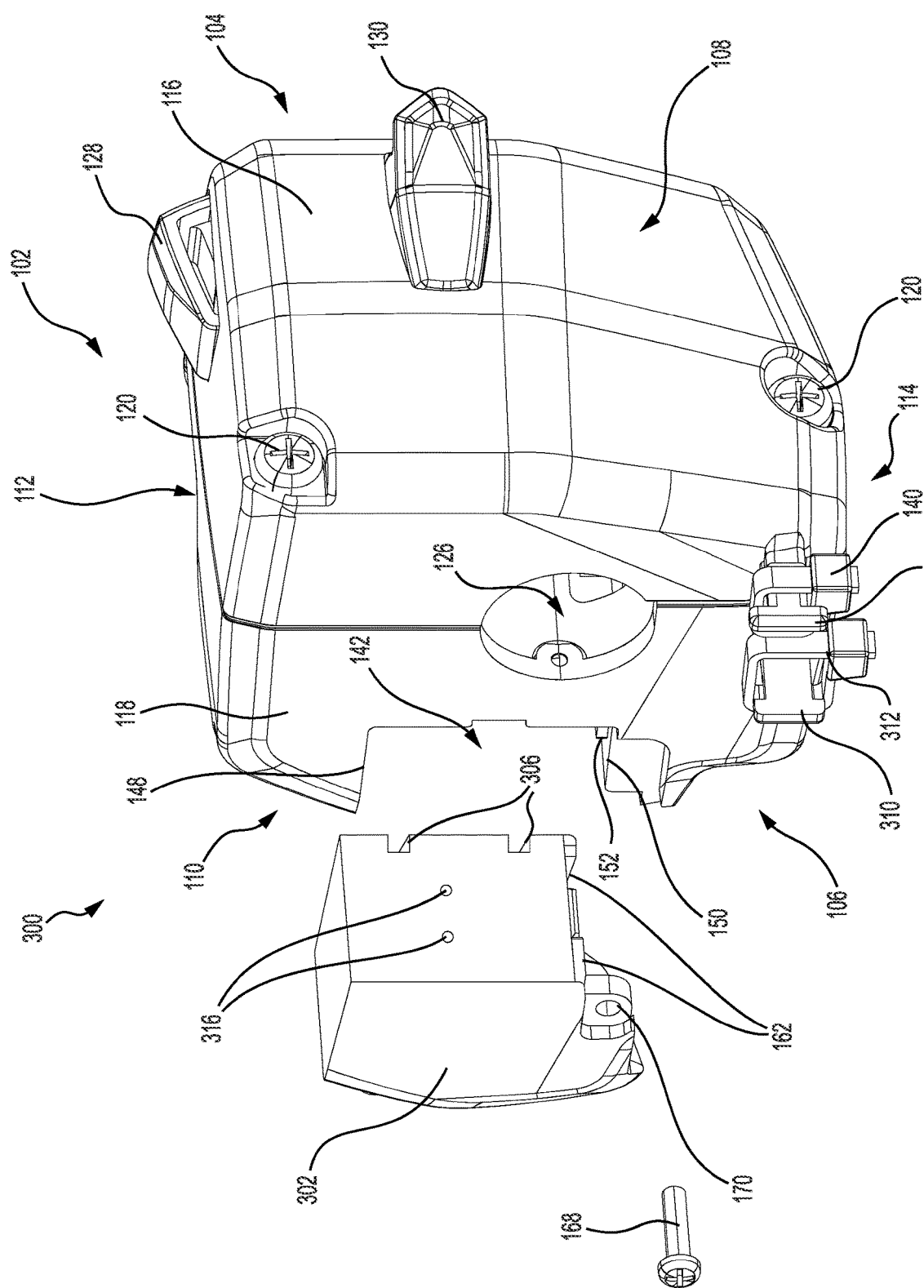
FIG. 13 is a partially exploded perspective view, taken from a front, right side of the switch assembly of FIG. 12.

FIGS. 12 and 13 illustrate a switch assembly 300 which is an alternative embodiment of the switch assembly 100. For simplicity, elements of the switch assembly 300 that correspond to those of the switch assembly 100 have been labeled with the same reference numerals and will not be described again.

In the switch assembly 300, the switch housing 158 has been replaced by a switch housing 302 to be received in the recess 142. A pair of winch switches 156A, 156B are mounted on a rear side of the switch housing 302. The winch switches 156A, 156B are used to control the winch 40. When the winch switch 156A is pressed, the winch motor reels-in the winch cable 42. When the winch switch 156B is in pressed, the winch cable 42 is reeled out from its initial position. It is contemplated that the switches 156A, 156B could be used to control one or more other vehicle components.

In the switch assembly 300, the generally longitudinally extending keys 154 have been replaced by generally longitudinally extending keys 304 provided on the left wall 146 of the recess 142. Accordingly, the generally longitudinally extending keyways 164 of the switch housing 158 have been replaced in the switch housing 302 by generally longitudinally extending keyways 306 (FIG. 13) on a left side of the switch housing 302. Similarly, a cap (not shown) to be used to cover the recess 142 when the switch housing 302 is not provided in the recess 142 would be similar to the cap 174 described above, but with the generally longitudinally extending keyways 178 of the cap 174 replaced by generally longitudinally extending keyways on a left side of the cap. The selected one of the switch housing 358 and the cap is inserted into the recess 142 by sliding it generally longitudinally into the recess 142 from the rear side 110 of the main housing 102, such that the keys are received in the keyways.

In this embodiment, the electric wire 160 is inserted in a right side of the main housing 102. More specifically, one end of the electric wire 160 is disposed inside the main housing 102 and connects to an electrical connector in the form of pins 308. As can be seen in FIG. 12, the pins 308 extends rearward from the front wall 144 of the recess. The electric wire 160 exits the main housing 102 via a grommet (not shown) provided on the rear housing portion 118, on the lower right side 106 of the main housing 102, and the portion of the electric wire 160 exiting the main housing 102 is fastened to a tab 310 by a tie-wrap 312. In this embodiment, the electric cable 138 exits the main housing 102 via a grommet (not shown) provided on the front housing portion 116, next to the electric wire 160. As such, the tab 139 is also provided on the front housing portion 116. By exiting the main housing 102 next to each other, the electric wire 160 and the electric cable 138 can easily be received in a common harness 314. It is also contemplated that the electric wire 160 could enter the main housing 102 with the electric cable 138. In such an embodiment, the tab 310 and the tie wrap 312 would be omitted.

An electrical connector in the form of pair of electrical conductive sleeves 316 is connected to the switch housing 302. As can be seen in FIG. 13, the sleeves 316 are inserted in the front wall of the switch housing 302. The sleeves 316 are electrically connected to the switches 156A, 156B. By sliding the switch housing 302 into the recess 142 such that the keys 152, 304 of the main housing 102 are received in the keyways 162, 306 of the switch housing 302 respectively, the pins 308 are received in the sleeves 316, thereby establishing an electrical connection. As a result, the switches 156A, 156B communicate with the winch motor of the winch 40. It is contemplated that the pins 308 could be provided on the switch housing 302 and the sleeves 316 could be provided on the main housing 102. It is also contemplated that other types of electrical connectors could be provided which would establish an electrical connection when the switch housing 302 is inserted in the recess 142. When the cap is provided on the main housing 102 instead of the switch housing 302, the cap covers the pins 308, thereby protecting the pins 308 from damage.

It is contemplated that a switch assembly similar to the switch assembly 100, 200, or 300 could be mounted to the right side of the handlebar 30 instead of the switch assembly 36.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A vehicle comprising:
   a frame;
   a vehicle body connected to the frame;
   a motor supported at least in part by the frame for powering the vehicle;
   at least one seat supported by the frame for receiving a rider thereon;
   a handlebar disposed at least in part forward of the seat for steering the vehicle; and
   a switch assembly mounted to the handlebar, the switch assembly comprising:
      a main housing mounted to the handlebar, the main housing comprising:

a first lateral side;
a second lateral side opposite the first lateral side;
a rear side; and
a front side,
the main housing defining a recess, the recess opening in the first lateral side and the rear side; and
one of:
a cap selectively received in the recess; and
a switch housing selectively received in the recess, the switch housing having a switch mounted thereto, the switch communicating with a component of the vehicle,
the recess being configured for receiving the cap and for receiving the switch housing,
the switch assembly having a first configuration and a second configuration,
in the first configuration:
the one of the cap and the switch housing being the cap,
the switch housing being removed from the recess, and
the cap being received in the recess; and
in the second configuration:
the one of the cap and the switch housing being the switch housing,
the cap being removed from the recess, and
the switch housing being received in the recess.

2. The vehicle of claim 1, wherein the switch is a first switch; and
further comprising a second switch mounted to the main housing, the second switch communicating with another component of the vehicle.

3. The vehicle of claim 1, wherein the handlebar extends generally laterally through the main housing.

4. The vehicle of claim 1, wherein the first lateral side faces generally laterally inward.

5. The vehicle of claim 1, further comprising a fastener fastening the one of the cap and the switch housing to the main housing.

6. The vehicle of claim 1, wherein:
the component is a winch connected to the frame; and the switch operates the winch.

7. The vehicle of claim 1, wherein the switch is a button having at least first and second positions.

8. The vehicle of claim 1, wherein:
the cap covers openings defined in the first lateral side and the rear side by the recess; and
the switch housing covers the openings.

9. The vehicle of claim 1, wherein the button faces generally rearward.

10. The vehicle of claim 1, wherein the one of the cap and the switch housing is inserted into the recess by sliding generally laterally into the recess from the first lateral side.

11. The vehicle of claim 10, wherein:
the main housing has generally laterally extending keys;
the cap has generally laterally extending keyways configured to receive the keys; and
the switch housing has generally laterally extending keyways configured to receive the keys.

12. The vehicle of claim 11, wherein:
the main housing has generally longitudinally extending keys;
the cap has generally longitudinally extending keyways configured to receive the keys; and
the switch housing has generally longitudinally extending keyways configured to receive the keys.

13. The vehicle of claim 1, wherein the one of the cap and the switch housing is inserted into the recess by sliding generally longitudinally into the recess from the rear side.

14. The vehicle of claim 1, wherein the switch is a first switch; and
further comprising a second switch mounted to the switch housing.

15. A vehicle comprising:
a frame;
a vehicle body connected to the frame;
a motor supported at least in part by the frame for powering the vehicle;
at least one seat supported by the frame for receiving a rider thereon;
a handlebar disposed at least in part forward of the seat for steering the vehicle;
a switch assembly mounted to the handlebar, the switch assembly comprising:
a main housing mounted to the handlebar, the main housing comprising:
a first lateral side;
a second lateral side opposite the first lateral side;
a rear side; and
a front side,
the main housing defining a recess, the recess opening in the first lateral side and the rear side; and
one of:
a cap selectively received in the recess; and
a switch housing selectively received in the recess, the switch housing having a switch mounted thereto, the switch communicating with a component of the vehicle,
the recess being configured for receiving the cap and for receiving the switch housing; and
an electric wire connected to the switch and extending partially inside the switch housing; and
wherein, when the one of the cap and the switch housing is the switch housing, the electric wire does not extend in an interior of the main housing.

16. The vehicle of claim 15, wherein the electric wire exits the switch housing via a lateral side of the switch housing corresponding to the first lateral side of the main housing.

17. A vehicle comprising:
a frame;
a vehicle body connected to the frame;
a motor supported at least in part by the frame for powering the vehicle;
at least one seat supported by the frame for receiving a rider thereon;
a handlebar disposed at least in part forward of the seat for steering the vehicle;
a switch assembly mounted to the handlebar, the switch assembly comprising:
a main housing mounted to the handlebar, the main housing comprising:
a first lateral side;
a second lateral side opposite the first lateral side;
a rear side; and
a front side,
the main housing defining a recess, the recess opening in the first lateral side and the rear side; and
one of:
a cap selectively received in the recess; and
a switch housing selectively received in the recess, the switch housing having a switch mounted thereto, the switch communicating with a component of the vehicle,
the recess being configured for receiving the cap and for receiving the switch housing;

a first electrical connector connected to the main housing;
an electric wire connected to the first electrical connector and extending partially inside the main housing; and
a second electrical connector connected to the switch housing and electrically connected to the switch; and
wherein, when the one of the cap and the switch housing is the switch housing, the first electrical connector is connected to the second electrical connector for communicating the switch with the component of the vehicle.

18. The vehicle of claim 17, wherein:
the one of the cap and the switch housing is inserted into the recess by sliding into the recess; and
the first electrical connector connects to the second electrical connector by sliding the switch housing into the recess.

* * * * *

UNITED STATES PATENT AND TRADEMARK OFFICE
CERTIFICATE OF CORRECTION

PATENT NO. : 12,202,568 B2
APPLICATION NO. : 17/781026
DATED : January 21, 2025
INVENTOR(S) : Walid Ben Attouch Page 1 of 1

It is certified that error appears in the above-identified patent and that said Letters Patent is hereby corrected as shown below:

In the Claims

In Claim 17, Column 12, Line 67, "for receiving the switch housing:" should read --for receiving the switch housing;--

Signed and Sealed this
Third Day of June, 2025

Coke Morgan Stewart
*Acting Director of the United States Patent and Trademark Office*